United States Patent
Shen et al.

(10) Patent No.: US 12,333,112 B2
(45) Date of Patent: Jun. 17, 2025

(54) SYSTEM AND METHOD FOR PARALLEL TOUCH SENSING

(71) Applicant: Synaptics Incorporated, San Jose, CA (US)

(72) Inventors: Guozhong Shen, Fremont, CA (US); Tom Vandermeijden, San Jose, CA (US); Ching-Hsung Wang, Santa Clara, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/643,808

(22) Filed: Apr. 23, 2024

(65) Prior Publication Data

US 2024/0377907 A1 Nov. 14, 2024

Related U.S. Application Data

(60) Provisional application No. 63/465,201, filed on May 9, 2023.

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05)

(58) Field of Classification Search
CPC ..... G06F 3/0418; G06F 3/0446; G06F 3/0443
See application file for complete search history.

(56) References Cited

U.S. PATENT DOCUMENTS

| 11,409,396 B1* | 8/2022 | Hoch .................... G06F 3/0445 |
| 2013/0015868 A1 | 1/2013 | Peng |

(Continued)

FOREIGN PATENT DOCUMENTS

WO 2016209590 A1 12/2016

OTHER PUBLICATIONS

International Search Report, dated Aug. 21, 2024, in International Patent Application No. PCT/US2024/027192.

*Primary Examiner* — Amy Onyekaba
(74) *Attorney, Agent, or Firm* — Leydig, Voit & Mayer, Ltd.

(57) ABSTRACT

A system and method for capacitive sensing using an input device are provided. The input device includes a display, a touch sensor and a processing system. The touch sensor has a plurality of transmitter electrodes with a first subset of positive transmitter electrodes driven by a positive sensing signal and a second subset of negative transmitter electrodes driven by a negative sensing signal. Each positive transmitter electrode spatially alternates with a negative transmitter electrode of the second subset of negative transmitter electrodes. The touch sensor includes a plurality of receiver electrodes arranged in differential pairs. Each differential pair includes a positive receiver electrode coupled to at least one of the first subset of positive transmitter electrodes and a negative receiver electrode coupled to at least one of the second subset of negative transmitter electrodes. The processing system transmits the positive sensing signal and the negative sensing signal, and receives a first resulting signal from the positive receiver electrode and a second resulting signal from the negative receiver electrode. The first resulting signal and the second resulting signal are combined to mitigate noise.

20 Claims, 6 Drawing Sheets

(56) References Cited

U.S. PATENT DOCUMENTS

| | | | |
|---|---|---|---|
| 2016/0291679 A1 | 10/2016 | Jordan et al. | |
| 2018/0088706 A1* | 3/2018 | Tanemura | G06F 3/04164 |
| 2018/0253167 A1* | 9/2018 | Park | G06F 3/0445 |
| 2019/0179446 A1* | 6/2019 | Kremin | G06F 3/0416 |
| 2019/0265857 A1* | 8/2019 | Chou | G06F 3/04164 |
| 2020/0133409 A1* | 4/2020 | Tanemura | G06F 3/0443 |
| 2020/0387248 A1* | 12/2020 | Kim | G06F 3/04182 |
| 2021/0211129 A1* | 7/2021 | Muranaka | G06F 3/04166 |
| 2021/0349574 A1* | 11/2021 | Manca | G06F 3/04166 |
| 2022/0043523 A1* | 2/2022 | Kim | G06F 3/04182 |

* cited by examiner

SYSTEM AND METHOD FOR PARALLEL TOUCH SENSING

CROSS REFERENCE TO RELATED APPLICATIONS

This application claims the benefit of U.S. Provisional Application Ser. No. 63/465,201, entitled "SYSTEM AND METHOD FOR PARALLEL SENSING IN A TOUCH SENSOR," filed on May 9, 2023, the contents of which are expressly incorporated by reference in their entirety.

TECHNICAL FIELD

This disclosure generally relates to touch sensors.

BACKGROUND

Input devices such as touch sensor devices (also commonly called touchpads, touch sensors, or proximity sensor devices), are used in a variety of electronic systems. Touch sensor devices typically include a sensing region, often demarked by a surface, in which the touch sensor device determines the presence, location and/or motion of one or more input objects, typically for purposes of allowing a user to provide user input to interact with the electronic system. The input device may be a touchscreen that includes a plurality of electrodes and is also capable of allowing the user to provide user input to interact with the electronic system. In recent years, foldable devices having touchscreens or other types of capacitive sensors have been developed. Touch sensors may be integrated in a display such as, for example, commonly found in mobile phones, laptops and similar devices.

Touch sensor devices operating within an electronic system may differentiate between different types of touch events. For example, a finger touch may be interpreted as selection of a particular location on a touch screen, while a palm touch on a large area of a touch screen may be interpreted differently and activate different functionality. Detection of objects having different object sizes, particularly in the presence of noise mitigation, can be unreliable with existing solutions.

SUMMARY

In an exemplary embodiment, a touch sensor is provided. The touch sensor includes a plurality of transmitter electrodes with a first subset of positive transmitter electrodes configured to be driven by a positive sensing signal and a second subset of negative transmitter electrodes configured to be driven by a negative sensing signal. Each positive transmitter electrode of the first subset of positive transmitter electrodes spatially alternates with a negative transmitter electrode of the second subset of negative transmitter electrodes. The touch sensor also includes a plurality of receiver electrodes arranged in differential pairs. Each differential pair includes a positive receiver electrode coupled to at least one of the first subset of positive transmitter electrodes and a negative receiver electrode coupled to at least one of the second subset of negative transmitter electrodes. The touch sensor further includes a sensor circuit configured to provide the positive sensing signal and the negative sensing signal, and to receive a first resulting signal from the positive receiver electrode and a second resulting signal from the negative receiver electrode. The first resulting signal and the second resulting signal are combined to mitigate noise In a further exemplary embodiment, an input device is provided. The input device includes a display, a touch sensor and a processing system. The touch sensor has a plurality of transmitter electrodes with a first subset of positive transmitter electrodes configured to be driven by a positive sensing signal and a second subset of negative transmitter electrodes configured to be driven by a negative sensing signal. Each positive transmitter electrode of the first subset of positive transmitter electrodes spatially alternates with a negative transmitter electrode of the second subset of negative transmitter electrodes. The touch sensor includes a plurality of receiver electrodes arranged in differential pairs. Each differential pair includes a positive receiver electrode coupled to at least one of the first subset of positive transmitter electrodes and a negative receiver electrode coupled to at least one of the second subset of negative transmitter electrodes. The processing system is configured to transmit the positive sensing signal and the negative sensing signal, and to receive a first resulting signal from the positive receiver electrode and a second resulting signal from the negative receiver electrode. The first resulting signal and the second resulting signal are combined to mitigate noise In a yet a further exemplary embodiment, a method for capacitive sensing is provided. The method includes driving a plurality of positive transmitter electrodes with a positive sensing signal and driving a plurality of negative transmitter electrodes with a negative sensing signal in a configuration where the plurality of positive transmitter electrodes spatially alternate with the plurality of negative transmitter electrodes. The method also includes receiving first resulting signals from a plurality of positive receiver electrodes in a configuration where each positive receiver electrode is coupled to at least one of the plurality of positive transmitter electrodes and receiving second resulting signals from a plurality of negative receiver electrodes in a configuration where each negative receiver electrode is coupled to at least one of the plurality of negative transmitter electrodes. The method further includes combining the second resulting signals and the first resulting signals and determining the presence of an input object based on the combined resulting signals.

DESCRIPTION

The following detailed description is exemplary in nature and is not intended to limit the disclosure or the application and uses of the methods and systems described herein. Furthermore, there is no intention to be bound by any expressed or implied theory presented in the preceding technical field, background, summary and brief description of the drawings, or the following detailed description.

Exemplary systems and methods discussed herein provide for detecting input objects of varying sizes including instances when the touch area is relatively large compared to the overall touch sensor. In conventional approaches, mitigating noise can be difficult when detecting relatively large objects. Such problems can arise, for example, because some noise reduction techniques feedback average resulting signals into the touch sensor from a large number or even all sensing circuits (e.g., electrodes) to mitigate noise. As such, large areas of touch provide resulting signals that approximate the average signal causing the touch signal to be cancelled out or to be very small and hence difficult to measure and detect. According to exemplary embodiments, a parallel sensing method and system are used to accurately and reliably detect input objects of varying sizes, including large input objects, while at the same facilitating mitigation of noise caused by various sources.

Figure 1:
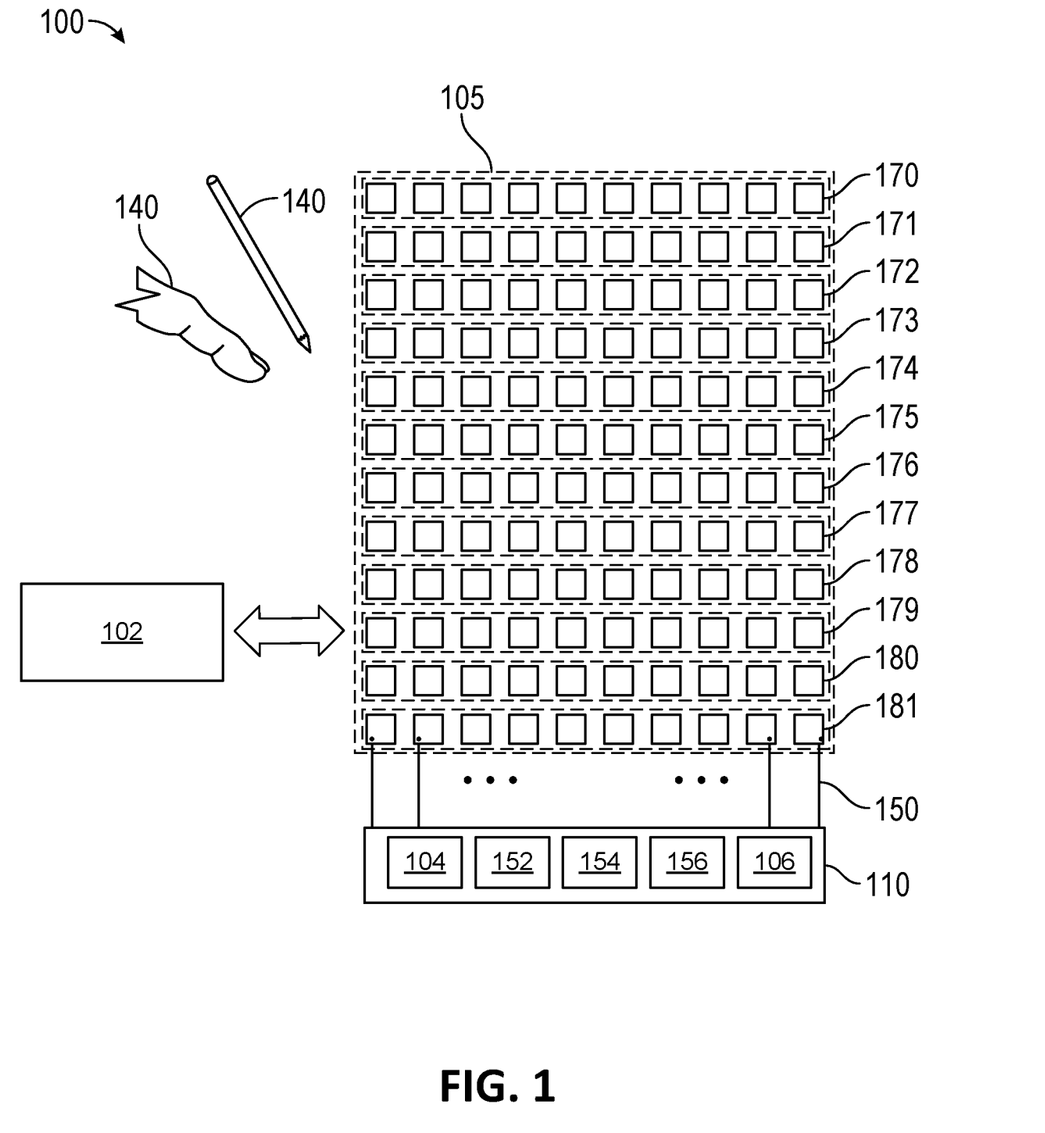
FIG. 1 is a block diagram of an input device, according to one or more embodiments.

FIG. 1 illustrates an input device 100 configured to provide input to an electronic system 102, which can be used to implement capacitive parallel sensing in at least certain modes as described herein. Some non-limiting examples of electronic systems include desktop computers, laptop computers, netbook computers, tablets, terminals, kiosks, mobile (e.g., cellular) phones, automotive multimedia centers and internet of things (IoT) devices, among others. The input device 100 may be part of the electronic system 102 or may be a separate component communicatively coupled to the electronic system 102.

The input device 100 includes a processing system 110 and sensor electrodes 105. The processing system 110 operates the sensor electrodes 105 to detect one or more input objects 140 or other condition in a sensing area of the input device 100. Example input objects 140 include fingers and styli, as shown in FIG. 1. Input objects may include parts of a hand other than a finger, such as a palm or side of the hand.

The sensing area of the input device 100 encompasses any space above, around, in and/or near the input device 100 in which the input device 100 is able to detect user input, e.g., user input provided by one or more input objects 140. In certain embodiments, the input device 100 is able to detect other conditions, such as an angle at which a foldable device is open.

The sensor electrodes 105 are coupled to the processing system 110 via conductive paths, e.g., traces 150. An exemplary pattern of the sensor electrodes 105 illustrated in FIG. 1 comprises an array of sensor electrodes 105 disposed in a plurality of rows and columns. In one example, the sensor electrodes 105 are disposed in rows, e.g., rows 170-181. In other embodiments, the sensor electrodes may be disposed in columns. It is contemplated that the sensor electrodes 105 may be arranged in other patterns, such as polar arrays, repeating patterns, non-repeating patterns, non-uniform arrays, or other suitable arrangement. The sensor electrodes 105 may have any suitable shape, such as circular, rectangular, diamond, star, square, nonconvex, convex, nonconcave, concave, or other geometry.

The sensor electrodes 105 may be disposed in a common layer. For example, the sensor electrodes 105 may be disposed on a first side of a common substrate. In other embodiments, the sensor electrodes 105 may be disposed in two or more layers. For example, a portion of the sensor electrodes 105 may be disposed on a first layer and another portion of the sensor electrodes may be disposed on a second layer. The first and second layers may be disposed on different sides of a common substrate, or disposed on different substrates.

The sensor electrodes 105 may be comprised of a conductive material such as a metal mesh, indium tin oxide (ITO), or the like. Further, the sensor electrodes 105 are ohmically isolated from each other such that one or more insulators separate the sensor electrodes and prevent them from electrically shorting to each other.

The processing system 110 includes sensor circuitry 104. Further, the processing system 110 may include a determination circuit 106. The processing system 110 is configured to operate the sensor electrodes 105 to detect one or more input objects 140 or other condition in the sensing area of the input device 100. The processing system 110 fully or partially resides in one or more integrated circuit (IC) chips. For example, the processing system 110 may include a single IC chip. Alternatively, the processing system 110 includes multiple IC chips. The processing system may also include one or more discrete circuits.

The sensor circuitry 104 is coupled to the sensor electrodes 105 via the routing traces 150 and is configured to drive the sensor electrodes 105 with sensing signals to detect one or more input objects 140 in the sensing area of the input device 100. The sensor circuitry 104 may also be configured to drive the sensor electrodes 105 with other signals, such as guarding signals and/or ground signals.

The sensor circuitry 104 includes digital and/or analog circuitry. For example, the sensor circuitry 104 comprises transmitter (or driver) circuitry configured to drive or transmit sensing signals onto the sensor electrodes 105 and receiver circuitry to receive resulting signals from the sensor electrodes 105. The transmitter circuitry may include one or more amplifiers and/or one or more modulators configured to drive sensing signals on to the sensor electrodes 105.

The processing system 110 may include analog to digital converters (ADCs and/or DACs) 154, analog front ends (AFEs) 152 comprising, for example, integrators configured to receive resulting signals from the sensor electrodes 105. The processing system 110 may include compensation circuitry 156 configured to provide signals to compensate for background capacitance. The ADCs (and/or DACs) 154, AFEs 152 and compensation circuit 156 may be part of the sensor circuitry 104 or may form different circuits.

The sensor circuitry 104 may drive the sensor electrodes in various modes. In some modes, the sensor circuitry 104 may utilize all sensor electrodes 105 to detect an input object. In other modes, the sensor circuitry 104 may only utilize a subset of the sensor electrodes 105 to detect an input object.

In certain embodiments or modes, the sensor circuitry 104 drives a first one or more of the sensor electrodes 105 with a transcapacitive sensing signal and receives a resulting signal with a second one or more of the sensor electrodes 105 to operate the sensor electrodes 105 for transcapacitive sensing. Operating the sensor electrodes 105 for transcapacitive sensing detects changes in capacitive coupling between sensor electrodes driven with a transcapacitive sensing signal and sensor electrodes operated as receiver electrodes. The capacitive coupling may be reduced when an input object (e.g., the input object 140) coupled to a system ground approaches the sensor electrodes. Driving the sensor electrodes 105 with transcapacitive sensing signals comprises modulating the sensor electrodes 105 relative to a reference voltage, e.g., system ground. Transcapacitive sensing may be used in connection with a parallel touch sensing mode as described in FIG. 3-FIG. 6; however, it will be understood that tanscapactive sensing is not limited to parallel touch sensing modes. For example, transcapacitive sensing may include driving rows of the sensor electrodes 105 with a transcapacitive sensing signal and reading columns of the sensor electrodes 105 to obtain resulting signals and/or vice versa.

The transcapacitive sensing signal is a periodic or aperiodic signal that varies between two or more voltages. Further, the transcapacitive sensing signal typically has a frequency between 50 kHz and 1 MHz, but in other embodiments other frequencies may be utilized. The transcapacitive sensing signal may have a peak-to-peak amplitude in a range of about 1 V to about 10 V. However, in other embodiments, the transcapacitive sensing signal may have a peak-to-peak amplitude greater than about 10 V or less than about 1 V. Additionally, the transcapacitive sensing signal may have a square waveform, a sinusoidal waveform, triangular waveform, a trapezoidal waveform, or a sawtooth waveform, among others.

In some embodiments, operating the sensor electrodes 105 to receive resulting signals comprises holding the sensor electrodes 105 at a substantially constant voltage or modulating the sensor electrodes 105 relative to the transcapacitive sensing signal. A resulting signal includes effect(s) corresponding to one or more transcapacitive sensing signals, and/or to one or more sources of environmental interference, e.g., other electromagnetic signals.

In other embodiments or modes, the sensor circuitry 104 operates the sensor electrodes 105 for absolute capacitive sensing by driving a first one or more of the sensor electrodes 105 with an absolute capacitive sensing signal and receiving a resulting signal with the driven sensor electrodes. Operating the sensor electrodes 105 for absolute capacitive sensing detects changes in capacitive coupling between sensor electrodes driven with an absolute capacitive sensing signal and an input object (e.g., the input object 140). The capacitive coupling of the sensor electrodes 105 driven with the absolute capacitive sensing signal is altered when an input object (e.g., the input object 140) coupled to a system ground approaches the sensor electrodes.

The absolute capacitive sensing signal is a periodic or aperiodic signal that varies between two or more voltages. Further, the absolute capacitive sensing signal typically has a frequency between about 50 kHz and about 1 MHz, but in other embodiments, other frequencies may be utilized. Additionally, the absolute capacitive sensing signal may have a square waveform, a sinusoidal waveform, triangular waveform, a trapezoidal waveform, or a sawtooth waveform, among others. The absolute capacitive sensing signal may have a peak-to-peak amplitude in a range of about 1 V to about 10 V. However, in other embodiments, the absolute capacitive sensing signal may have a peak-to-peak amplitude greater than about 10 V or less than about 1 V. In various embodiments, driving the sensor electrodes 105 with an absolute capacitive sensing signal comprises modulating the sensor electrodes 105. A resulting signal received while performing absolute capacitive sensing may comprise effect(s) corresponding to one or more absolute capacitive sensing signals, and/or to one or more sources of environmental interference, e.g., other electromagnetic signals. The absolute capacitive sensing signal may be the same or different from the transcapacitive sensing signal used in transcapacitance sensing.

In certain embodiments, the sensor circuitry 104 drives a subset of the sensor electrodes 105 with a guard signal. A sensor electrode driven with a guard signal may be referred to as a guarded sensor electrode or guard electrode. Driving a sensor electrode with a guard signal mitigates a voltage difference between the guarded sensor electrode and a sensor electrode driven with the absolute capacitive sensing signal in parallel. Driving the guard signal onto a first one or more sensor electrodes while driving the sensing signal onto a second one or more sensor electrodes results in little or no change in capacitance between the guarded sensor electrode(s) and the sensor electrode(s) driven with the absolute capacitive sensing signal.

It will be appreciated that the sensor circuitry 104 may drive the sensor electrodes 105 in multiple modes. For example, the sensor circuitry 104 may drive the sensor electrodes 105 in a transcapactive mode during a first time period and an absolute capacitive mode during a second time period. Further, the sensor circuitry 104 may drive the sensor electrodes 105 with multiple versions of a particular mode. For example, the sensor circuitry 104 may drive the sensor electrodes a in parallel transcapactive sensing mode during a first period of time and a non-parallel transcapacitive sensing mode during a second period of time. Non-parallel transcapacitive sensing, for example, involves driving either rows or columns with a transcapacitive sensing signal and reading resulting signals from the other of the rows or columns as previously described. Parallel transcapacitive sensing involves both driving and reading electrodes having generally the same orientation (e.g., non-overlapping).

The determination circuit 106 receives the resulting signals from the sensor circuitry 104 and processes the resulting signals to determine changes in capacitive coupling of the sensor electrodes 105. The determination circuit 106 utilizes the changes in capacitive coupling of the sensor electrodes 105 to determine positional information of one or more input objects (e.g., the input object 140) or to determine a change in capacitance for other reason. The determination circuit 106 may perform other functions, such as measuring the amount of noise present in one or more regions of a sensing area and/or determining whether positional information has been corrupted or degraded by noise. In certain embodiments, the determination circuit 106 may combine resulting signals. For example, the determination circuit 106 subtracts a resulting signal from one receiver electrode from a resulting signal from another receiver electrode to form a differential signal.

In one or more embodiments, measurements of the changes in capacitive coupling determined from the resulting signals received from the sensor electrodes 105 may be utilized by the determination circuit 106 to form a capacitive image. The resulting signals utilized to detect the changes in capacitive coupling are received during a capacitive frame. A capacitive frame may correspond to one or more capacitive images. Multiple capacitive images may be acquired over multiple time periods, and differences between the images used to derive information about an input object 140 in the sensing area of the input device 100. For example, successive capacitive images acquired over successive periods of time can be used to track the motion(s) of one or more input objects entering, exiting, and within the sensing area.

"Positional information" as used herein broadly encompasses absolute position, relative position, velocity, acceleration, and other types of spatial information in zero, one, two or three dimensions as appropriate. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Figure 2:
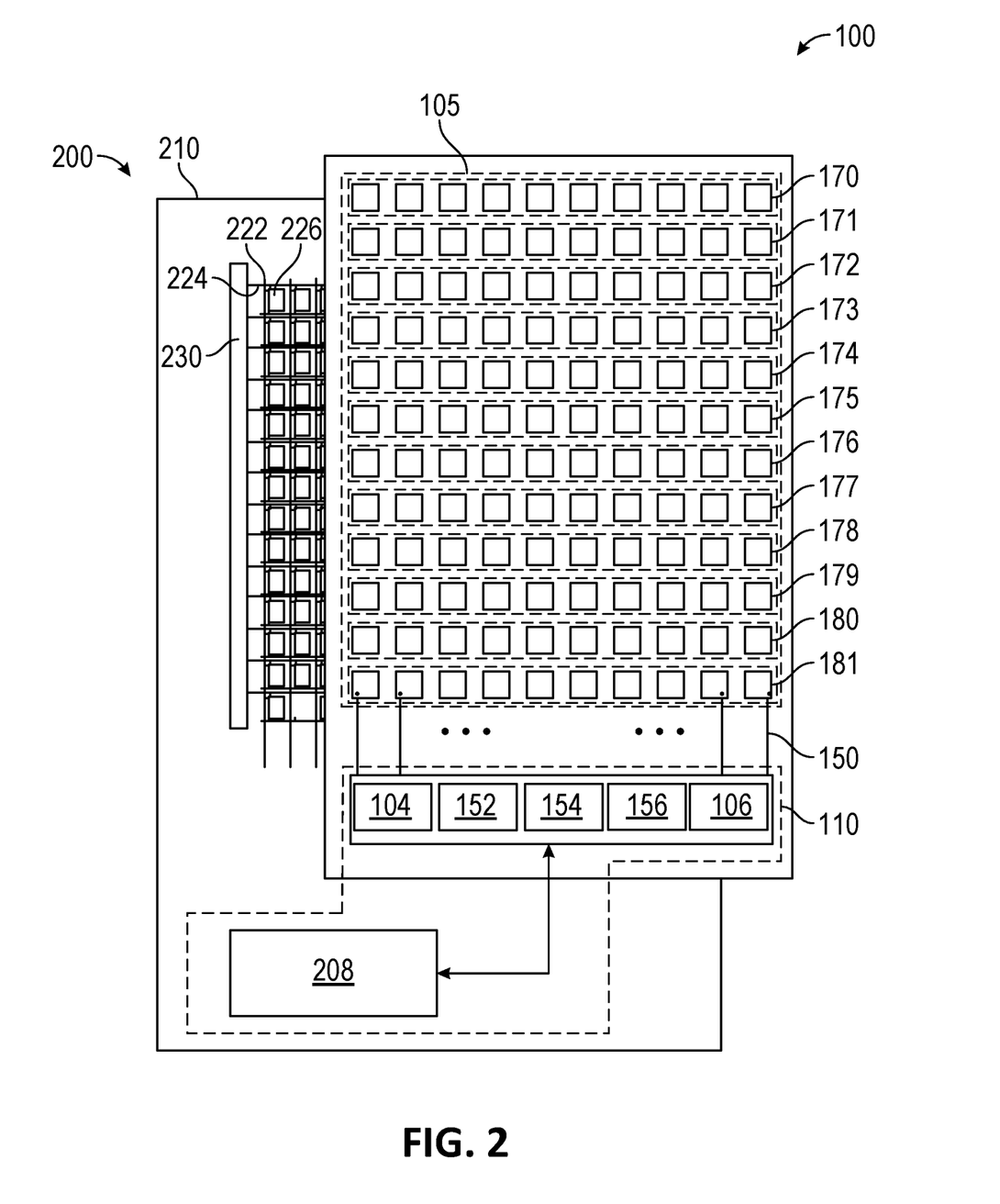
FIG. 2 is a block diagram of an input device with integrated display, according to one or more embodiments.

FIG. 2 illustrates an example of the input device 100 wherein the input device is shown overlapped and/or integrated with a display of a display device 200. The display of the display device 200 may be any suitable type of display such as, for example, light emitting diode (LED), microLED, organic LED (OLED), microOLED, liquid crystal display (LCD), plasma, electroluminescence (EL), or other display technology.

The display device 200 includes a display panel 210 communicatively coupled with a display driver 208 and gate selection circuitry 230. The display panel 210 includes display electrodes that are driven to update subpixel electrodes 226 of the display panel 210. The display electrodes include data lines 222 and gate lines 224, among others. The display driver 208 may be part of the processing system 110 (FIG. 1) or may be a separate component.

The data lines 222 are coupled to the display driver 208 and the gate lines 224 are coupled to the gate selection circuitry 230. Each of the subpixel electrodes 226 is coupled to one of the gate lines 224 and one of the data lines 222. The gate selection circuitry 230 is configured to drive gate select and gate deselect signals onto the gate lines 224 to select (activate) and deselect (deactivate) corresponding subpixels for updating.

The display driver 208 includes display driver circuitry configured to drive the data lines 222 with subpixel data signals to update the selected subpixels electrodes 226 and update the display of the display device 200. For example, the display driver 208 may drive display update signals onto the data lines 222 during corresponding display updating periods.

The display driver 208 is configured to update the subpixel electrodes 226 to update an image displayed on the display panel 210 during display frames. The display frames may be updated, or refreshed, once about every 16 ms, generating a display refresh rate of about 60 Hz. In other embodiments, other display refresh rates may be employed. For example, the display refresh rate may be 90 Hz, 120 Hz, 140 Hz, or greater.

The display driver 208, the sensor circuitry 104, the determination circuit 106, the AFEs 152, the ADCs (and/or DACs) 154, and the compensation circuitry 156 may be part of a common processing system (e.g., the processing system 110 forms a touch and display controller). Alternatively, the display driver 208 may be part of a first processing system and the sensor circuitry 104, AFEs 152, the ADCs (and/or DACs) 154, the compensation circuitry 156, and the determination circuit 106 may be part of a second processing system. Further, the display driver 208, the sensor circuitry 104, the AFEs 152, the ADCs 154, the compensation circuitry 156 and the determination circuit 106 may be part of a common IC chip. Alternatively, one or more of these components may be disposed in a first IC chip and a second one or more of these components may be disposed on a second IC chip, etc. As an alternative, any of the sensor circuitry 104, AFEs 152, the ADCs (and/or DACs) 154, the compensation circuitry 156, and/or the determination circuit 106 may be implemented in whole or in part by one or more discrete circuits.

In various embodiments, the sensor circuitry 104 is configured to drive the sensor electrodes for capacitive sensing during a capacitive frame at a capacitive frame rate. Further, each capacitive frame may include multiple periods during which different sensor electrodes 105 are operated for capacitive sensing.

The "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or multiple of the display frame rate. Further, the capacitive frame rate may be a rational fraction of the display rate (e.g., ½, ⅔, 1, 3/2, 2). In one or more embodiments, the display frame rate may change while the capacitive frame rate remains constant. In other embodiment, the display frame rate may remain constant while the capacitive frame rate is increased or decreased. Alternately, the capacitive frame rate may be unsynchronized from the display refresh rate or the capacitive frame rate may be a non-rational fraction of the display rate to minimize interference "beat frequencies" between the display updating and the input sensing.

In one or more embodiments, capacitive sensing (or input sensing) and display updating may occur during at least partially overlapping periods. For example, the sensor circuitry 104 is configured to operate the sensor electrodes 105 for capacitive sensing while the display driver 208 operates the gate lines 224 and data lines 222 to update an image displayed by the display panel 210. For example, updating the display panel 210 and operating the sensor electrodes 105 for capacitive sensing may be asynchronous with each other. Further, updating the display panel 210 and operating the sensor electrodes 105 for capacitive sensing may or may not be synchronized with each other.

In one or more embodiments, updating the display panel 210 and operating the sensor electrodes 105 for capacitive sensing may occur during non-overlapping periods. For example, updating the display panel 210 may occur during display update periods and operating the sensor electrodes 105 for capacitive sensing may occur during non-display update periods. The non-display update periods may be a blanking period that occurs between the last line of a display frame and the first line of the following display frame (e.g., during a vertical blanking period). Further, the non-display update periods may occur between display line update periods for two consecutive display lines of a display frame and are at least as long in time as the display line update period. In such embodiments, the non-display update period may be referred to as a long horizontal blanking period or long h-blanking period, where the blanking period occurs between two display line updating periods within a display frame and is at least as long as a display line update period.

Figure 3:
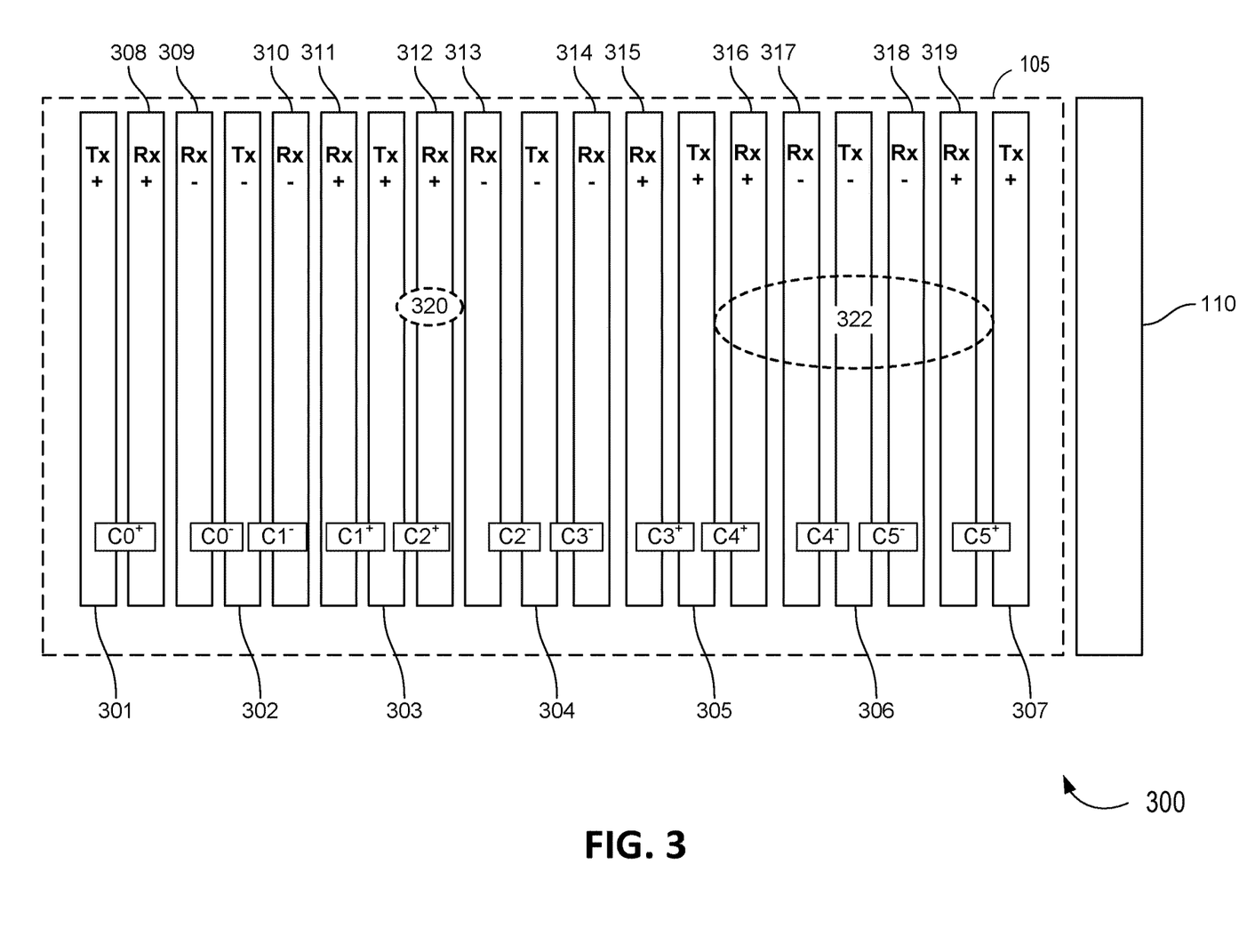
FIG. 3 is a block diagram of a touch sensor with electrodes configured for parallel touch sensing, according to one or more embodiments.

FIG. 3 illustrates an example of a touch sensor with sensor electrodes 105 configured for parallel sensing in accordance with certain embodiments. In the example of FIG. 3, the sensor electrodes 105 may be operated in a transcapacitive sensing mode. The sensor electrodes 105 used for parallel sensing may include all or only a subset of the sensor electrodes of the input device 100. For example, for a 16 by 40 electrode touch sensor, a parallel sensing mode may only include 6 transmitter and 10 receiver electrodes as compared to 16 transmitter electrodes and 40 receiver electrodes for non-parallel transcapacitive sensing. Of course, this is provided by way of example only and all of the sensor electrodes 105 or any suitable subset thereof may be employed.

A plurality of sensor electrodes 301-319 are depicted as being disposed generally parallel to one another, e.g., in a non-overlapping manner. Although electrodes 301-319 are shown vertically, they may have any desired orientation, e.g., horizontal or at an angle. It will be understood that, although each of electrodes 301-319 is shown as a single sensor element, each of the sensor electrode 301-319 may include one or more individual electrodes, for example, as shown and described in connection with rows or columns 170-181 in FIG. 1.

The embodiment shown in FIG. 3 shows seven transmitter electrodes 301-307 and twelve receiver electrodes 308-319. The number of transmitter and receiver electrodes is not limited to the number shown and will vary considerably depending, for example, on the size of the overall touch sensor, desired resolution, pitch of sensor electrodes, and desired size of sensor used for parallel touch sensing.

A first subset of the transmitter electrodes 301, 303, 305 and 307 represent positive polarity transmitter electrodes, referred to as positive transmitter electrodes, and a second subset of the transmitter electrodes 302, 304, and 306 represent negative polarity transmitter electrodes, referred to as negative transmitter of electrodes. The positive and negative transmitter electrodes are disposed in alternating fashion, e.g., the positive transmitter electrode 301 is spatially followed by the negative transmitter electrode 302, which is spatially followed by the positive electrode 303 and so forth. As will be described further below, positive transmitter electrodes are driven with a positive sensing signal and the negative transmitter electrodes are driven with a relative negative or opposite polarity sensing signal. For example, the negative sensing signal may be the inverse of the positive transmitter signal where the negative sensing signal is 180 degrees out of phase with the positive sensing signal. In some embodiments, a transmitter electrode may be driven with a positive sensing signal at one point in time and may be driven with a negative sensing signal at another point. Thus, the term positive transmitter electrode and/or negative transmitter electrode may be relative to a specific point in time. Alternating the polarity or phase of the transmitter sensing signals helps mitigate touch to display (T2D) noise.

The receiver electrodes 308-319 are arranged as differential pairs. Receiver electrodes 308, 311, 312, 315, 316 and 319 are positive receiver electrodes that are disposed for capacitive coupling to at least one respective positive transmitter electrode. For example, positive receiver electrode 308 is adjacent and capacitively coupled to positive transmitter electrode 301. As a second example, positive receiver electrode 319 is adjacent and capacitively coupled to positive transmitter electrode 307.

Receiver electrodes 309, 310, 313, 314, 317, and 318 are negative receiver electrodes that are disposed for capacitive coupling to a respective negative transmitter electrode. For example, the negative receiver electrode 309 is adjacent and capacitively coupled to the negative transmitter electrode 302. As a second example, the negative receiver electrode 318 is adjacent and capacitively coupled to the negative transmitter electrode 306. The positive and negative receiver electrodes will generate resulting signals having a signal strength depending on the presence or absence of a proximate input object. The resulting signals may also include noise caused by a display or other source, one illustrative example of which is zebra noise caused by displayed zebra patterns, e.g., patterns which have alternating dark and light rows or columns.

Capacitive coupling exists between the transmitter electrodes and adjacent receiver electrodes. For example, as illustratively shown, capacitance $C0^+$ represents the capacitive coupling between positive transmitter electrode 301 and positive receiver electrode 308. Capacitance $C0^-$ represents the capacitive coupling between negative transmitter electrode 302 and negative receiver electrode 309. The amount of capacitive coupling varies depending on the presence or absence of an input object as well as other factors as previously described.

The arrangement of transmitter and receiver electrodes as shown in the example of FIG. 3 results in differential pairs of positive and negative receiver electrodes interposed between positive and negative transmitter electrodes. For example, a first receiver pair 308, 309 is disposed between positive transmitter electrode 301 and negative transmitter electrode 302. Similarly, a second receiver pair 310, 311 is disposed between negative transmitter electrode 302 and positive transmitter electrode 303 and so forth. Each electrode pair, e.g., adjacent set of receiver electrodes, forms a differential pair. Noise may be mitigated by combining resulting signals. For example, noise may be mitigated by subtracting a resulting signal read from one receiver electrode in the differential pair from a resulting signal read from the other receiver electrode in the differential pair, e.g., by subtracting the resulting signal read from negative receiver electrode 309 from the resulting signal read from positive receiver electrode 308. Noise is minimized or eliminated because noise will tend to affect each receiver electrode in a differential pair in the same way. Thus, subtracting one resulting signal from another resulting signal cancels out or mitigates noise, such as display noise.

FIG. 3 illustrates an example with a total of 19 electrodes. Such an exemplary arrangement may include a positive transmitter electrode at each end of the sensor electrodes 105. Numerous other arrangements are possible. For example, in an 18 electrode arrangement, one of the edge transmitter electrodes may be removed. As another example, in a 17 electrode arrangement, both edge transmitter electrodes may be removed. As yet another example, in a 16 electrode arrangement 3 consecutive electrodes may be removed, e.g., the three farthest right or the three farthest left electrodes shown in FIG. 3. These configurations are, of course, provided by way of example and not limitation.

In general, positive and negative receiver electrodes are always provided in pairs while the edge transmitter electrodes may not be present depending on the total number of electrodes. However, with respect to positive and negative transmitter electrodes, the row sum of total drive transmitter electrodes will typically either by 0 (equal number of positive and negative transmitter electrodes) or 1 (unequal number of positive and negative electrodes). These configurations minimize touch to display (T2D) noise because noise on the positive transmitter electrodes will generally cancel out or minimize noise on the negative transmitter electrodes.

In some implementations, the transmitter electrodes and the receiver electrodes may be shifted over time, which process may include, for example, converting one or more transmitter electrodes to a receiver electrode and converting one or more receiver electrodes to an opposite polarity receiver electrode or to a transmitter electrode. For example, FIG. 3 may represent the configuration of transmitter and receiver electrodes during a first time period, e.g., first capacitive frame. During a second subsequent time period, e.g., second subsequent capacitive frame, the configuration may be shifted such that electrode 308 becomes a positive transmitter electrode, electrode 309 becomes a positive receiver electrode, electrode 302 becomes a negative receiver electrode, electrode 310 becomes a negative transmitter electrode, and so forth. This sequence reflects a shift from left to right, but a shift from right to left is also contemplated. Shifting the electrodes as described can facilitate minimizing dead spots in the detection pattern, e.g., where an input object is directly over a transmitter electrode or centered between receiver electrodes.

In operation, a touch controller or other processing system 110, drives the positive transmitter electrodes with a positive polarity sensing signal and drives the negative transmitter electrodes with, for example, an opposite polarity sensing signal (such as a negative or inverse of positive sensing signal) to create a differential signal. The processing system 110 reads the resulting signals on the receiver electrodes and may process them as differential resulting signals. For example, the resulting signal at positive receiver electrode 308 (C0$^+$) and the resulting signal at negative receiver electrode 309 (C0$^-$) are read and processed as a differential pair. Likewise, the processing system 110 reads and processes the resulting signals at each of the receiver pairs 310 (C1$^-$), 311 (C1$^+$); receiver pairs 312 (C2$^+$), 313 (C2$^-$); receiver pairs 314 (C3$^-$), 315 (C3$^+$); receiver pairs 316 (C4$^+$), 317 (C4$^-$) and receiver pairs 318 (C5$^-$), 319 (C5$^+$). The resulting signals of each pair are combined, e.g., processed as a difference signal (Ci$^+$–Ci$^-$) where Ci corresponds to the capacitive coupling between a transmitter electrode and adjacent receiver electrode. Thus, one resulting signal may be subtracted from the other resulting signal thereby mitigating noise as previously described. Before the resulting signals are processed in this matter, other noise removal techniques, such as Analog Display Noise Suppression (ADNS) or the like, may be applied to the resulting signals to avoid saturation of system components such as AFEs.

The embodiments described herein provide for accurate detection of both small and large objects without sacrificing noise mitigation. For example, a small object, including but not limited to a finger or a stylus, may touch the touch sensor device at location 320. The location of the touch 320 is closer to receiver electrode 312 as compared to receiver electrode 313. As a result of a difference in capacitive coupling, the touch generates a different resulting signal at receiver electrode 312 than the resulting signal at receiver electrode 313. These different resulting signals are by analyzed the processing system 110. The differential signal will be interpreted by the processing system 110 as a touch at the location of receiver electrode 312 when, for example, the differential signal exceeds a threshold. The differential signal at other differential pairs, e.g., 314, 315, will be near zero or at least below a threshold thereby indicating that no object has touched the touch sensor device along receiver electrodes 314, 315.

As another example, a large object, including but not limited to a palm or side of a hand, may touch the touch sensor device at location 322. The location 322 of the second touch covers a larger area than touch 320 and, for example, generally covers and capacitively couples to a plurality of differential receiver pairs, e.g., electrodes 316, 317, and 318, 319. The differential signal measured by the processing system 110 at each differential pair will be relatively large, e.g., exceed a threshold, thereby signaling that an object has touched the touch sensor device in the region of receiver electrodes 316, 317 and 318 and 319. As with the example of the small object 320, the differential signal at other differential pairs, e.g., 308, 309 will be near zero or below a threshold thereby indicating that no object has touched the touch sensor device at the location of the other receiver electrodes.

In the case of both small objects, e.g., touch 320, and larger objects, e.g., touch 322, the differential signals pairs are read and combined, e.g., processed as a difference signal, e.g., one signal is subtracted from the other thereby cancelling noise. Unlike conventional touch sensors, the arrangement therefore mitigates noise and accurately detects touches from objects of various sizes including relatively large objects.

It will be understood that the touch sensor need not exclusively operate in a parallel transcapacitive mode. For example, the touch sensor may at various times be operated in a conventional transcapactive mode where sensors of one orientation, e.g., rows, are driven by a sensing signal and resulting signals are read from electrodes of another orientation, e.g., columns, and vice versa. The electrodes may then be operated for parallel transcapacitive sensing in another mode. At various times, the electrodes may also be operated for absolute capacitive sensing in yet another mode.

Figure 4:
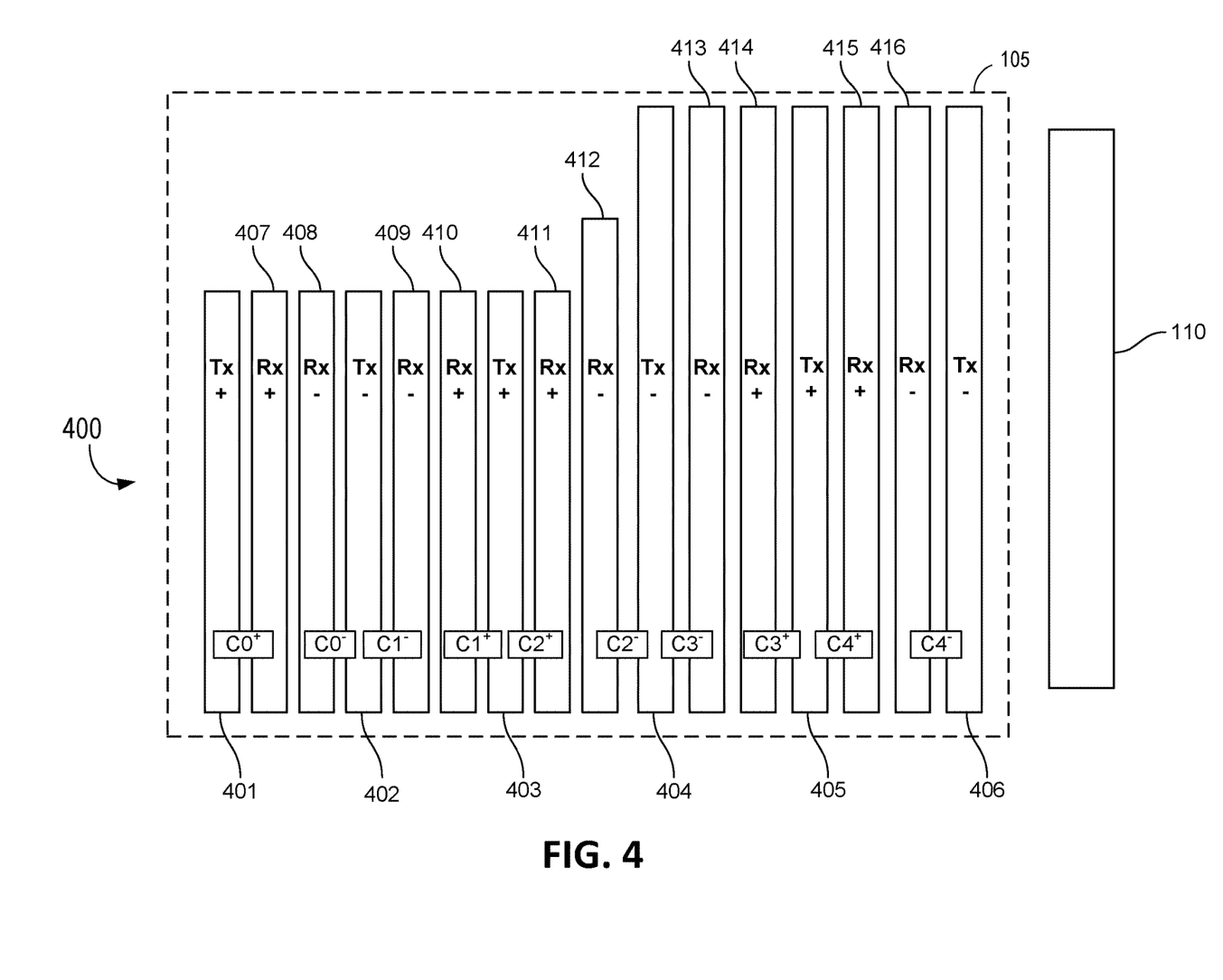
FIG. 4 is a block diagram of a touch sensor with electrodes configured for parallel touch sensing, according to one or more embodiments.

FIG. 4 illustrates another example of a touch sensor 400 having sensor electrodes 105 configured for parallel sensing in accordance with certain embodiments. As with the example of FIG. 3, the sensor electrodes as shown in FIG. 4 may be operated at least at certain times in a parallel transcapacitive sensing mode. Operation of the touch sensor shown in FIG. 4 is substantially the same as the example shown in FIG. 3 and is, therefore, not repeated. As in the case of the example of FIG. 3, the touch sensor 400 may comprise only a subset of all electrodes available for capacitive sensing.

Sensor electrodes 401-416 are depicted as being disposed generally parallel to one another and, although depicted vertically, may have any desired orientation. The embodiment shown in FIG. 4 shows six transmitter electrodes 401-406 and ten receiver electrodes 407-416, but, as with FIG. 3, the embodiment is not limited to any particular number of electrodes and any suitable number may be employed. The transmitter electrodes are disposed with alternating polarity, e.g., a positive transmitter electrode 401 followed by a negative transmitter electrode 402 followed by a positive transmitter electrode 403 and so forth. The positive transmitter electrodes may be driven with a positive sensing signal that is the inverse, e.g., 180 degrees out of phase with the negative sensing signal used to drive the negative transmitter electrodes. The alternating positive and negative transmitter electrodes mitigate T2D noise as previously described.

Receiver electrodes 407-416 are arranged as differential pairs between positive and negative transmitter electrodes. For example, positive receiver electrode 407 is adjacent and capacitively coupled to the positive transmitter electrode 401. As a second example, negative receiver electrode 416 is adjacent and capacitively coupled to negative transmitter electrode 406. The arrangement of differential pairs of receiver electrodes mitigates display noise as previously described.

Unlike the example of FIG. 3, however, the touch sensor 400 shown in FIG. 4 includes mismatched electrodes, e.g., transmitter and/or receiver sensor electrodes having different lengths. For example, transmitter electrodes 404-406 and receiver electrodes 413-416 are longer than transmitter electrodes 401-403 and receiver electrodes 407-412. Further, in the example shown, at least one differential pair of receiver electrodes 411, 412 are mismatched in that negative receiver electrode 412 is longer than positive receiver electrode 411. In the particular example, the longer electrodes are disposed closer to the processing system 110 relative to the shorter electrodes, although embodiments herein contemplate varying lengths of electrodes without limitation as to their relative location.

Embodiments with transmitter and receiver electrodes of varying lengths remain effective at mitigating noise and accurately detecting touches of various sizes notwithstanding mismatches in the size. It will be appreciated that any mismatch in size of the transmitter electrodes, e.g., transmitter electrodes 401-406, is less critical from the standpoint of noise reduction. Although mismatch between receiver electrodes may be more significant, the configuration minimizes the impact on display noise mitigation. For example, in the example, some mismatch exists in the size of receivers of differential pair 411, 412. However, the impact on noise reduction can be minimized by keeping the amount of mismatch minimal, e.g., less than 80 percent or less than 90 percent or less than 6 percent and/or by disposing the location of mismatch close to the processing system 110 relative to the far edge of the sensor.

Figure 5A:
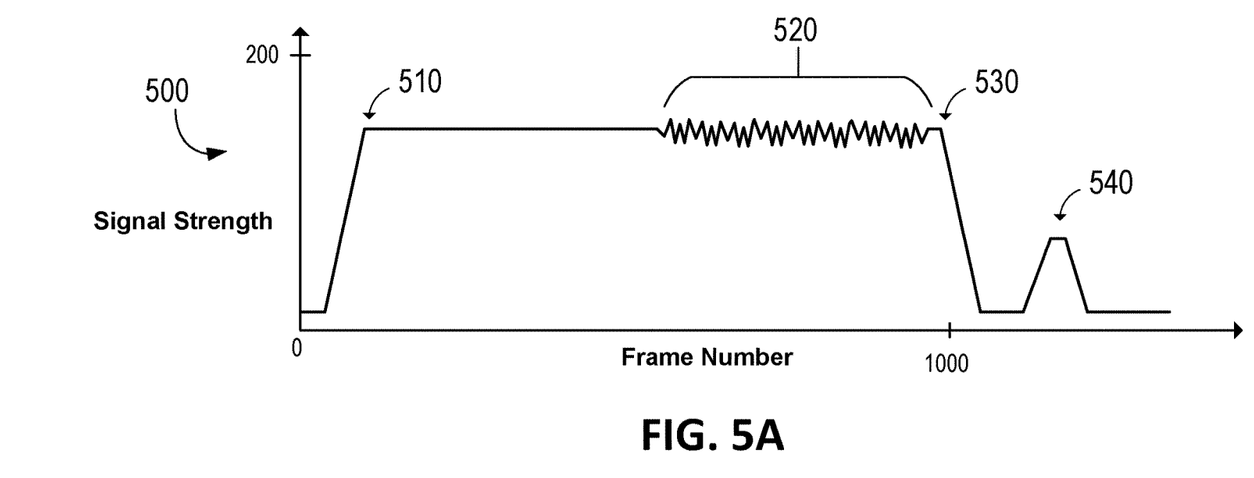
FIG. 5A illustrates a waveform of a resulting signal from differential receiver electrodes in a touch sensor device over a series of frames, according to one or more embodiments.

FIG. 5A illustrates a waveform 500 of a differential receiver electrode signal in a touch sensor device in an area proximate to a touch over a series of capacitive sensing frames in the presence of noise. The y-axis (vertical axis) indicates signal strength of the differential signal measured at one or more differential receiver electrode pairs in the area of touch. As one example, the y-axis may indicate the signal level of the differential signal measured between receiver electrodes as illustrated and described in connection with FIG. 3. The x-axis (horizontal axis) indicates frame numbers, e.g., a sequence of measurements over time. As can be seen from FIG. 5A, resulting signals can be read over a series of frames with each frame representing readings taken over some or all receiver electrodes from a burst of a sensing signal.

At time 510, a large object may be placed on the touch sensor device, including but not limited to a palm or side of a hand such as illustrated by touch 322 in FIG. 3. The resulting signal level may increase at the receiver electrodes proximate to the area of the touch, reflective of the large differential signal received at the receiver electrode pairs. At time 520, an interference signal may be introduced, e.g., display interference from display of a zebra pattern, although it will be understood that the embodiments herein are effective in mitigating various types of noise. As can be seen, the resulting signal strength attributable to the touch is much larger than the noise as a result of the mitigation provided by, for example, the differential measurements.

At time 530, the large object may be removed from contact with the touch sensor device. Also illustrated in FIG. 5A is a signal from a touch of a smaller object, such as touch 320 as shown in FIG. 3. As a particular example, at time 540, a finger may be placed on the touch sensor device. As shown in FIG. 5A, the signal level increases and may be detected as a finger touch of the touch sensor device. In this manner, differential pairs of receiver electrodes, and differential transmitter electrodes, as described with reference to FIG. 3, may detect both a large object and a small object while mitigating noise.

Figure 5B:
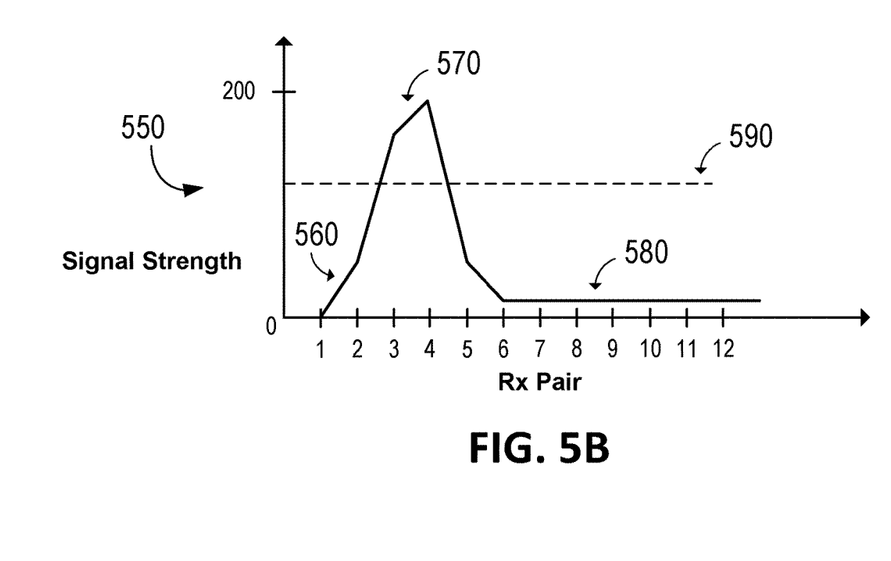
FIG. 5B illustrates a waveform of resulting signals from differential receiver electrodes across a plurality of differential receiver electrodes in a touch sensor device, according to one or more embodiments.

FIG. 5B illustrates a waveform 550 of the differential receiver electrode signals across a touch sensor device for a small object such as a finger touch. The y-axis (vertical axis) indicates the signal strength level of the differential signal measured between each receiver pair. The x-axis (horizontal axis) identifies a particular receiver (Rx) pair by number. For example, with reference to FIG. 3, receiver electrodes 308, 309 may form pair 0, receiver electrodes 310, 311 may form pair 1 and so forth. The example illustrated shows signal strength over 12 receiver pairs, with each pair having a positive receiver electrode and a negative receiver electrode. Of course, in accordance with the previous description, any suitable number of receiver pairs may be used.

As shown, at location 560, for receiver electrode pair 1 (e.g., corresponding to receiver electrodes 310, 311) and receiver electrode pair 2 (e.g., corresponding to receiver electrodes 312, 313), the processing system 110 may read relatively low levels of a resulting differential signal indicating no object is in contact with the touch sensor device in the regions near receiver pairs 1 and 2. For example, the signal strength as shown at receiver pairs 1 and 2 may not exceed a threshold 590.

At location 570, for receiver pair 3 (e.g., corresponding to receiver electrodes 314, 315) and receiver pair 4 (e.g., corresponding to receiver electrodes 316, 317), the processing system 110 may read relatively high levels of a resulting differential signal, e.g., sensing signals that exceed the threshold 590. The high levels of differential signal indicate that an object is in contact with or proximate to the touch sensor device in the regions near receiver pairs 3 and 4.

At location 580, for receiver pairs 5 through 12, the processing system 110 may again read low levels of resulting differential signal, e.g., differential signals below the threshold 590. The low levels of differential signals indicate that no object is in contact with the touch sensor device in the regions near receiver pairs 5 through 12.

Figure 6:
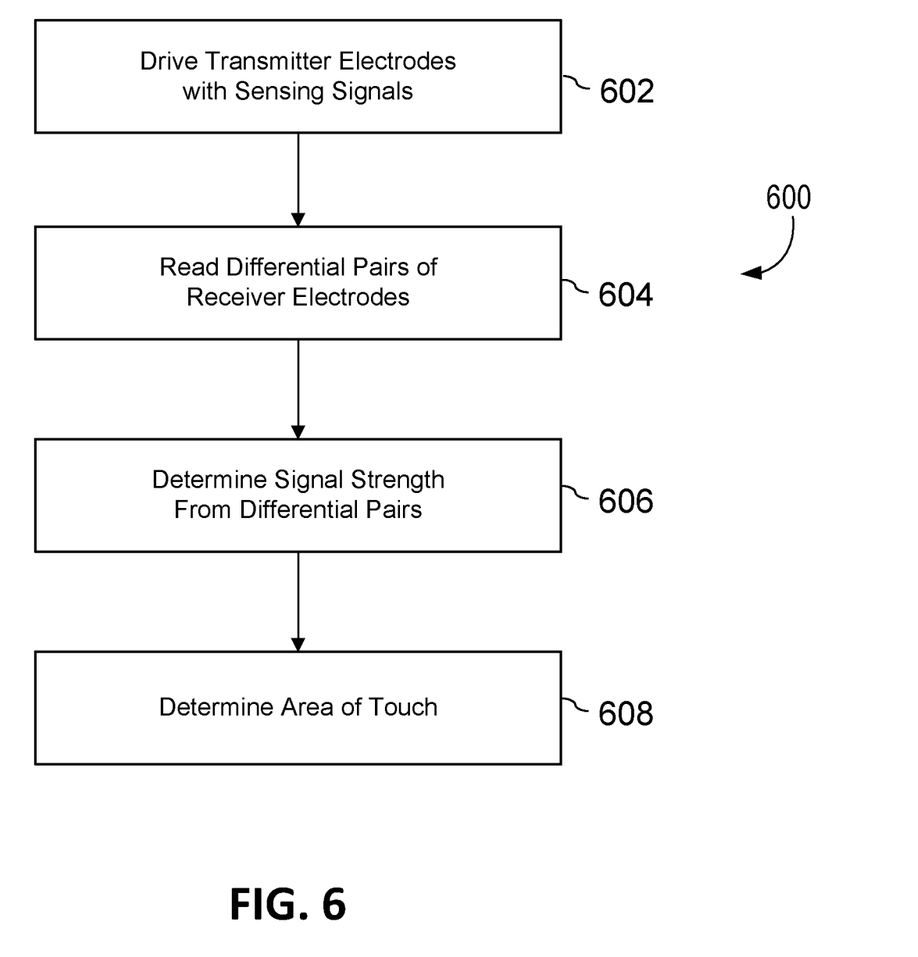
FIG. 6 illustrates a method for performing capacitive sensing using parallel touch sensing, according to one or more embodiments.

FIG. 6 illustrates a method 600 of operating a touch sensor in accordance with embodiments of parallel touch sensing described herein. It will be understood that the method 600 need not be performed in the order shown, and stages may be concurrently or simultaneously performed, except where otherwise apparent.

At stage 602, the processing system 110, e.g., sensor circuitry 104, drives the transmitter electrodes with sensing signals. For example, in connection with FIG. 3, the processing system 110 drives positive transmitter electrodes with a positive sensing signal and drives negative transmitter electrodes with an opposite polarity sensing signal. As previously described, the negative sensing signal may, for example, be the inverse or negative of the positive sensing signal.

At stage 604, the processing system 110 reads resulting signals from the differential pairs of receiver electrodes. The differential pairs may be read concurrently, sequentially or in some other order. Reading of the resulting signals may include application of noise mitigation techniques such as ADNS or the like.

At stage 606, the signal strength from each differential pair is determined. The signal strength may be determined by, for example, combining the signal read from the positive and negative receiver electrodes of each differential pair. As a specific example, a resulting signal of a negative receiver electrode may be subtracted from a resulting signal of an adjacent positive receiver electrode for each differential pair or vice versa. As previously described, subtracting a resulting signal from one of the differential pair from the other of the differential pair mitigates noise by removing (subtracting out) noise from resulting signals.

At stage 608, the processing system 110 determines if an object is proximate to one or more areas of the touch sensor. For example, an object is determined to be proximate to the touch sensor in a particular area if the differential resulting signal from a differential pair at a respective location exceeds a threshold value.

The process 600 may be repeated over multiple capacitive frames. Further, as discussed in connection with FIG. 3, the process 600 may include shifting left or right the transmitter and receiver electrodes to, for example, facilitate detection of input objects in areas such as dead spots in the detection pattern.

The method and system herein may be used to more efficiently implement functions and features such as a doze mode. Doze mode is a low power state used, for example, to conserve power. Conventional techniques may require two bursts of sensing signal to detect a touch to wake up from a doze mode. As reflected in the method and system described in connection with FIG. 3-FIG. 6, the embodiments herein can detect a touch with a single burst, which detected touch may be used to wake up the electronic device from a low power mode. Further power savings can be achieved with the system and method, which as previously described may be implemented using only a subset of the total number electrodes making up the touch sensor.

In view of the foregoing, it will be appreciated that exemplary embodiments of the present disclosure minimize the effects of noise, while at the same time provide accurate detection of input objects of various sizes and may be implemented in a manner that minimizes power consumption.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A touch sensor comprising:
   a plurality of transmitter electrodes comprising:
      a first subset of positive transmitter electrodes configured to be driven by a positive sensing signal;
      a second subset of negative transmitter electrodes configured to be driven by a negative sensing signal,
      wherein each positive transmitter electrode of the first subset of positive transmitter electrodes spatially alternates with a negative transmitter electrode of the second subset of negative transmitter electrodes;
   a plurality of receiver electrodes arranged in differential pairs, each differential pair comprising:
      a positive receiver electrode coupled to at least one of the first subset of positive transmitter electrodes;
      a negative receiver electrode coupled to at least one of the second subset of negative transmitter electrodes; and
   a sensor circuit configured to provide the positive sensing signal and the negative sensing signal, and to receive a first resulting signal from the positive receiver electrode and a second resulting signal from the negative receiver electrode, wherein the first resulting signal and the second resulting signal are combined to mitigate noise.

2. The touch sensor according to claim 1, wherein the negative sensing signal is an inverse of the positive sensing signal.

3. The touch sensor according to claim 1, wherein a first one or more of the plurality of transmitter electrodes and a first one or more of the plurality of receiver electrodes have a different length than a second one or more of the plurality of transmitter electrodes and a second one or more of the plurality of receiver electrodes.

4. The touch sensor according to claim 1, where the plurality of transmitter electrodes and the plurality of receiver electrodes have a same length.

5. The touch sensor according to claim 1, wherein the second resulting signal is subtracted from the first resulting signal to form a differential signal.

6. The touch sensor according to claim 5, wherein the differential signal is compared to a threshold value to determine a presence of an input object.

7. The touch sensor according to claim 1, wherein a total number of the first subset of positive transmitter electrodes equals a total number of the second subset of negative transmitter electrodes.

8. The touch sensor according to claim 1, wherein a total number of the first subset of positive transmitter electrodes and a total number of the second subset of negative transmitter electrodes differs by 1.

9. The touch sensor according to claim 1, wherein the plurality of transmitter electrodes and the plurality of receiver electrodes are configured to operate in a transcapacitive sensing mode.

10. The touch sensor according to claim 1, wherein one or more of the plurality of transmitter electrodes is converted to a receiver electrode and one or more of the plurality of receiver electrodes is converted to an opposite polarity receiver electrode or a transmitter electrode.

11. An input device comprising:
a display;
a touch sensor comprising:
- a plurality of transmitter electrodes comprising:
  - a first subset of positive transmitter electrodes configured to be driven by a positive sensing signal;
  - a second subset of negative transmitter electrodes configured to be driven by a negative sensing signal,
  - wherein each positive transmitter electrode of the first subset of positive transmitter electrodes spatially alternates with a negative transmitter electrode of the second subset of negative transmitter electrodes;
- a plurality of receiver electrodes arranged in differential pairs, each differential pair comprising:
  - a positive receiver electrode coupled to at least one of the first subset of positive transmitter electrodes;
  - a negative receiver electrode coupled to at least one of the second subset of negative transmitter electrodes; and
- a processing system configured to transmit the positive sensing signal and the negative sensing signal, and to receive a first resulting signal from the positive receiver electrode and a second resulting signal from the negative receiver electrode, wherein the first resulting signal and the second resulting signal are combined to mitigate noise.

12. The input device according to claim 11, wherein a first one or more of the plurality of transmitter electrodes and a first one or more of the plurality of receiver electrodes have a different length than a second one or more of the plurality of transmitter electrodes and a second one or more of the plurality of receiver electrodes.

13. The input device according to claim 11, wherein the second resulting signal is subtracted from the first resulting signal to form a differential signal, and the differential signal is compared to a threshold value to determine a presence of an input object.

14. The input device according to claim 11, wherein a total number of the first subset of positive transmitter electrodes and a total number of the second subset of negative transmitter electrodes differ by no more than 1.

15. The input device according to claim 11, wherein one or more of the plurality of transmitter electrodes is converted to a receiver electrode and one or more of the plurality of receiver electrodes is converted to an opposite polarity receiver electrode or a transmitter electrode.

16. A method for capacitive sensing, comprising:
driving a plurality of positive transmitter electrodes with a positive sensing signal; driving a plurality of negative transmitter electrodes with a negative sensing signal, wherein the plurality of positive transmitter electrodes spatially alternate with the plurality of negative transmitter electrodes;
receiving first resulting signals from a plurality of positive receiver electrodes, wherein each positive receiver electrode is coupled to at least one of the plurality of positive transmitter electrodes;
receiving second resulting signals from a plurality of negative receiver electrodes, wherein each negative receiver electrode is coupled to at least one of the plurality of negative transmitter electrodes;
combining the second resulting signals and the first resulting signals; and determining a presence of an input object based on the combined resulting signals.

17. The method according to claim 16, wherein combining the second resulting signals and the first resulting signals comprises subtracting the second resulting signals from the first resulting signals to form differential signals.

18. The method according to claim 16, wherein the plurality of positive transmitter electrodes are driven simultaneously with the plurality of negative transmitter electrodes.

19. The method according to claim 17, further comprising comparing the differential signals to a threshold value to determine the presence of the input object.

20. The method according to claim 16, further comprising:
driving one or more of the plurality of positive receiver electrodes or one or more of the negative receiver electrodes with a sensing signal; and
receiving resulting signals from one or more of the positive transmitter electrodes or one or more of the negative transmitter electrodes.

* * * * *